US006854931B1

(12) United States Patent
Lopata

(10) Patent No.: US 6,854,931 B1
(45) Date of Patent: Feb. 15, 2005

(54) APPARATUS FOR ESTABLISHING ADJUSTABLE DEPTH BED IN TRENCHES FOR UTILITY LINES AND ENCASING THE LINES

(75) Inventor: Michael E. Lopata, Clinton, NY (US)

(73) Assignee: PLC Trenching Co., LCC., Clinton, NY (US)

( * ) Notice: Subject to any disclaimer, the term of this patent is extended or adjusted under 35 U.S.C. 154(b) by 0 days.

(21) Appl. No.: 10/672,024

(22) Filed: Sep. 26, 2003

(51) Int. Cl.⁷ .............................................. F16L 1/028
(52) U.S. Cl. ...................................................... 405/179
(58) Field of Search ................................ 405/179, 178, 405/180, 181, 183, 177, 176, 174

(56) References Cited

U.S. PATENT DOCUMENTS

| | | | | |
|---|---|---|---|---|
| 3,849,998 A | * | 11/1974 | Thacker | 405/179 |
| 4,028,902 A | * | 6/1977 | Courson et al. | 405/177 |
| 4,289,424 A | * | 9/1981 | Shefbuch et al. | 405/179 |
| 4,462,715 A | * | 7/1984 | Ashbaugh | 405/157 |
| 4,741,646 A | * | 5/1988 | Hatch | 405/175 |
| 4,812,078 A | * | 3/1989 | Rivard | 405/179 |
| 5,174,685 A | * | 12/1992 | Buchanan | 405/179 |
| 5,765,966 A | * | 6/1998 | White et al. | 405/174 |
| 5,765,967 A | * | 6/1998 | Klaymar | 405/179 |
| 6,478,508 B1 | * | 11/2002 | Magnani et al. | 405/179 |

* cited by examiner

Primary Examiner—Frederick L. Lagman
(74) Attorney, Agent, or Firm—Darby & Darby

(57) ABSTRACT

A mechanized unit that places a predetermined and adjustable depth of a selected bedding material on the bottom of a trench in the ground, then places on the bed a continuous length of a utility or utilities having a predetermined spatial relationship with each other and then encases the utility or utilities with additional select material to a predetermined and adjustable depth of cover in a continuous operation. The unit has a single hopper that receives and contains the material that is used both to form the bed and also to encase the one or more utilities laid on the bed. The hopper conveys material in the direction of movement of the unit and the material is dispensed from the conveyor into the trench to form the bed. An adjustable height blade is provided which both sets the bed height and also smoothes the bed upper surface. As the unit moves, the utility or utilities are laid on the bed upper surface. Thereafter, material is dispensed from the bottom of the hopper on top of and around the utility or utilities to encase them. An adjustable height blade is also provided to set the height of the encasement and also to smooth out its upper surface.

18 Claims, 3 Drawing Sheets

APPARATUS FOR ESTABLISHING ADJUSTABLE DEPTH BED IN TRENCHES FOR UTILITY LINES AND ENCASING THE LINES

FIELD OF THE INVENTION

A mechanized unit for laying a bed of a material in a trench on which a utility is placed and then for encasing the utility in the material.

BACKGROUND OF THE INVENTION

Mechanized units are known that are moved through an existing trench in the ground for the purpose of laying a continuous length or lengths of a utility or utilities, such as conduits, pipes, cables, etc., or combinations thereof.

One type of mechanized unit exists for installing a utility surrounded by a select material at a predetermined position within an encasement of the select material in a trench. Where there is more than one utility line, the unit maintains a predetermined spatial relationship of the utilities with each other. Such a mechanized unit is propelled along the trench in which the flexible utility or utilities are being installed. The utility or utilities passes down through the unit by means of a guide device that supports the utility or utilities at a predetermined height above the trench bottom. As the utility or utilities pass through and/or have exited the guide device, the select material, located in the upper portion of the unit, gravitates in a generally vertical direction through the unit, onto and around the utility or utilities being installed.

There are drawbacks to this type of unit. The material as it gravitates on and around the utility or utilities being installed produces a vertical shear force on and can potentially damage the utility or utilities as they leave the control of the guide device which is above the bottom of the trench. Also, in this type of mechanized unit, the predetermined depth of select material that must end up, for protection, under the utility or utilities being installed must pass around and then must also flow underneath the utility or utilities to the bottom of the trench. This predetermined depth of select material can frequently not be guaranteed since most types of select material have varying flow and adhesive characteristics that change greatly with differing moisture contents. Obtaining the desired amount of select material required under the utility or utilities being installed is also made increasingly difficult as the diameter of the utilities become larger since this requires the select material to flow farther as it goes around and underneath the utility or utilities being installed.

In another type of mechanized unit, the utilities are to be placed at a desired depth in the trench on a bed of material, such as soil or concrete, of a desired height that is pre-laid on the bottom of the trench. As the utilities are placed on the bed, the unit maintains a desired spatial relationship between utilities in applications in which more than one utility to be laid in the trench. The utilities are laid on the bed by means of a guide device and the utility or utilities are then encased with a desired amount of material that is the same as or different from the bed material. The mechanized unit may be propelled through the trench by being connected directly to the device that digs the trench or by any other mechanical moving device, such as a tractor or other vehicle.

A unit of the latter type is disclosed in U.S. Pat. No. 6,478,508 granted on Nov. 12, 2002. The unit of this patent has a separate van, or hopper, for the each of the bedding and encasing materials. The unit is self-propelled or is towed along the trench as the bedding material is dispensed from one hopper to form the bed. The utility is laid on the bed and thereafter the encasing material is dispensed from the second hopper to encase the utility. This unit has the disadvantage that two hoppers are used and the two hoppers must be supplied with the materials. This means that there must be two separate sources of material supply, such as two vehicles that are moved along with the unit, or a single supply source that can feed two hoppers as the unit is moving. The latter configuration can present a problem in making certain that both hoppers are always adequately supplied with the material. Also, depending upon the depth of the bed and the depth of the encasement, the hoppers might have to be of different sizes and/or have the material supplied at different rates from the source or sources. This makes the material supply problem more complex and also gives rise to the possibility that one of the hoppers can become empty, which would interrupt the process of laying the utility or utilities. Also, the characteristics of the two materials in the two hoppers can be different so that there will not be a proper bonding or mixing of the material of the bed with the encasing material.

BRIEF DESCRIPTION OF THE INVENTION

The present invention is directed to a mechanized unit that places a predetermined and adjustable depth of a selected bedding material on the bottom of a trench in the ground, then lays on the bed a continuous length of a utility or utilities having a predetermined spatial relationship with each other and then encases the utility or utilities with additional select material to a predetermined and adjustable depth of cover all in one continuous operation. The mechanized unit of the invention has side walls that hold back the sides of the trench to prevent any material from falling into the trench which could damage the utility or utilities being installed prior to their encasement with the protective select material. The side walls are configured to also permit the bedding and encasement material to flow outside of the confines of the walls to the walls of the trench.

In a preferred embodiment of the invention the unit has a single hopper that contains the material used both to form the bed and also to encase the utility laid on the bed. The bedding material can be any one or combination of sand, crushed stone, flowable fill or Portland cement or concrete. In accordance with the invention, a part of the material in the single hopper is dispensed onto a conveyor carried by the unit. The conveyor moves the material in the direction of movement of the unit and the material is dispensed from the conveyor into the trench to form the bed. An adjustable height blade is provided which both sets the bed height and also smoothes the bed upper surface, as the unit moves. As the unit moves the utility or utilities are laid on the bed upper surface. Thereafter, material is dispensed from the bottom of the single hopper on top of and around the utility or utilities to encase them. An adjustable height blade is also provided to set the height of the encasement and also to smooth its upper surface.

The unit of the invention is relatively simple, yet highly versatile in being able to separately adjust the depth of each of the bed and the encasement. Also, since only one hopper is used for the material for both the bed and the encasement, the task of supplying the material is simplified.

BRIEF DESCRIPTION OF THE DRAWINGS

Other objects and advantages of this invention will become more apparent by referring to the following description and accompanying drawings in which.

DETAILED DESCRIPTION OF THE INVENTION

Figure 1:
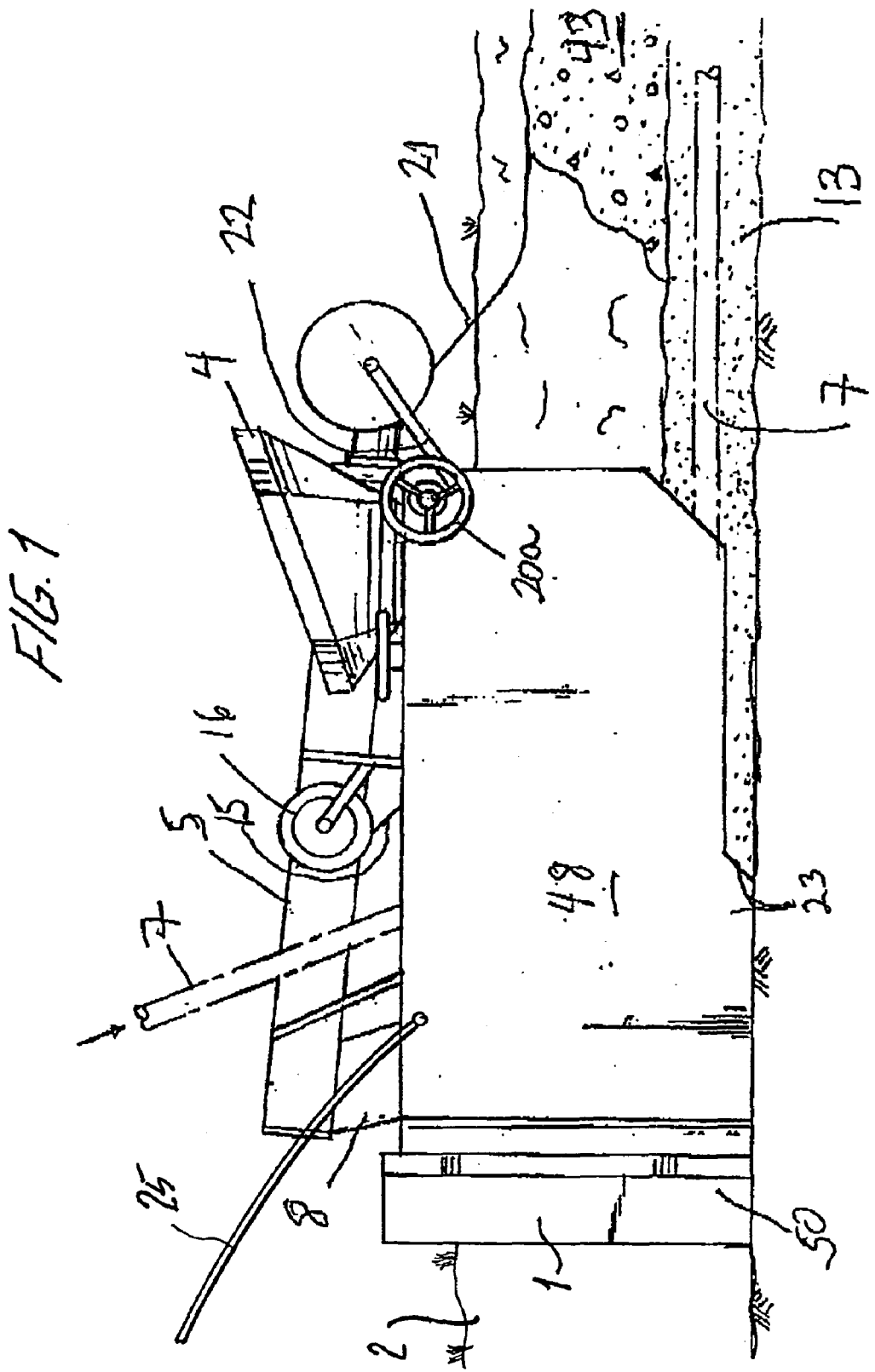
FIG. 1 is an overall side elevational view of the mechanized unit of the invention.
Figure 2:
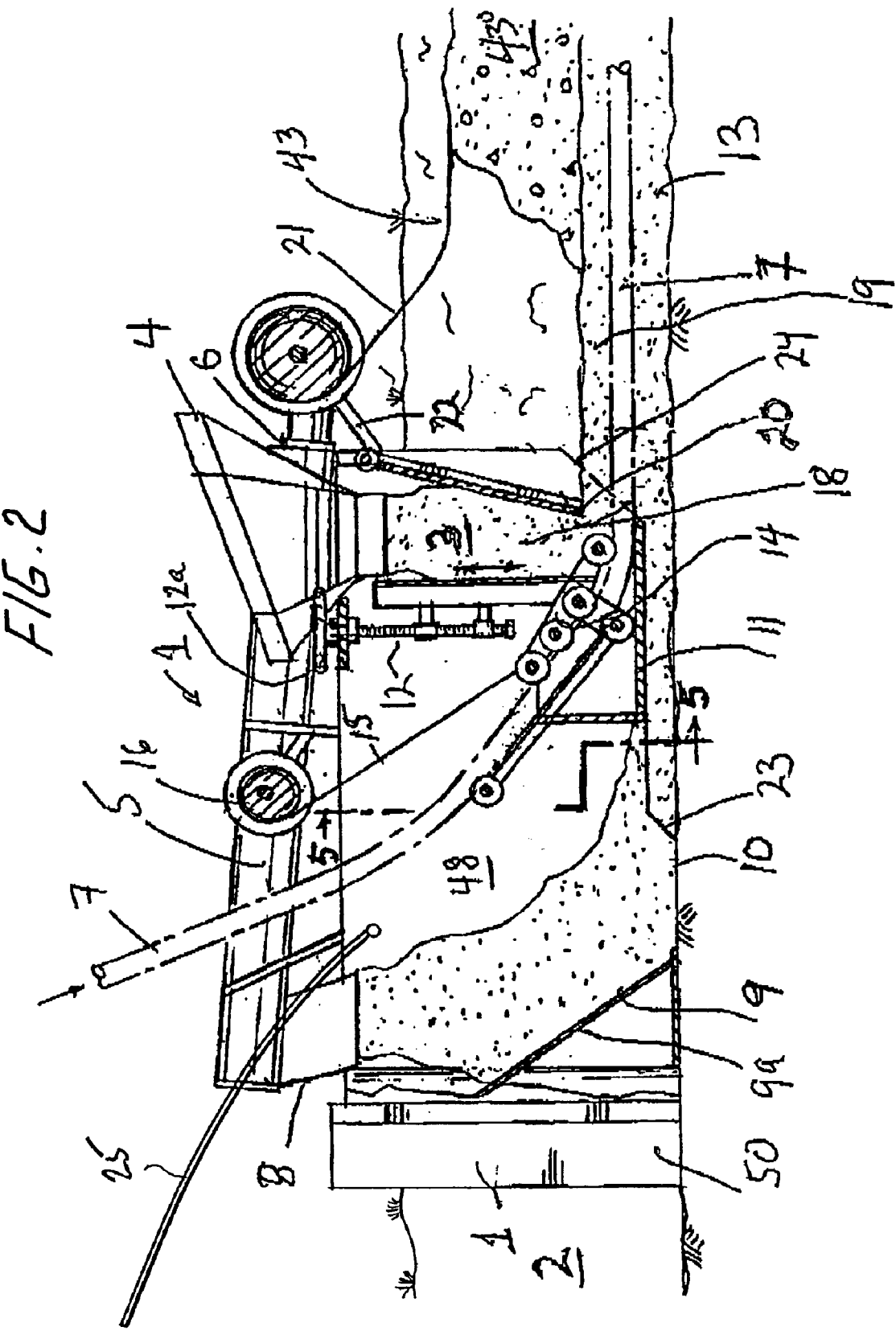
FIG. 2 is a side elevational view of a cross-section of the invention.
Figure 3:
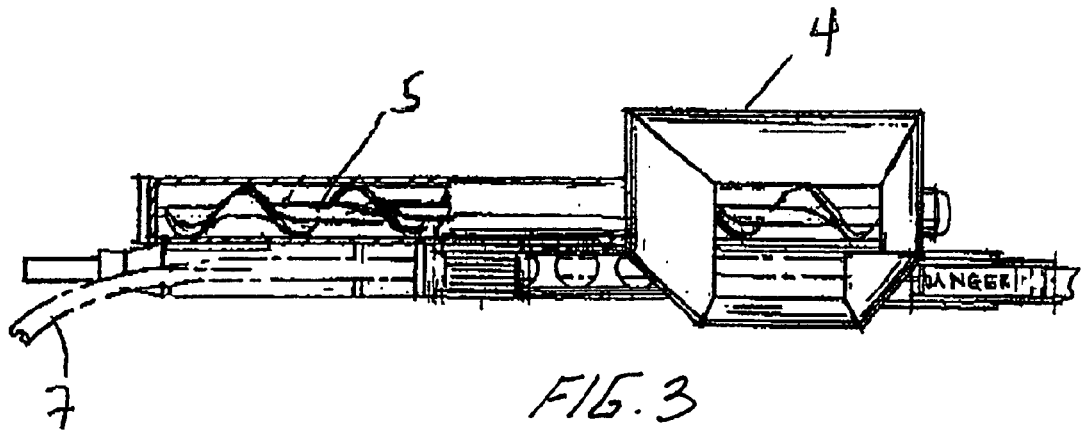
FIG. 3 is a top plan view of the unit.

Referring to FIGS. 1 and 2, the mechanized unit 1 of the invention is pulled through an existing trench 2, usually dug by a trenching unit (not shown) of any conventional type, or by any other mechanical means. For example, the unit 1 can be mounted on the same frame as the trenching unit that digs the trench 2. The combined trenching unit and the mechanized unit 1 can have its own motive means or be pulled or pushed along by any suitable motive means. Alternatively, the trenching unit and the unit 1 of the invention can be separate from each other and each moved by its own motive means. The mechanized unit 1 is moved forward in the trench 2 (right to left in FIGS. 1 and 2).

The unit 1 has a frame 50 on which a hopper 4 is mounted. Select material 3 is loaded into the top inlet of hopper 4 by any mechanical means such as a mobile material handling unit, ready mix truck, front end loader or any other suitable piece of equipment. The material can be sand, concrete, soil, mixtures of material, etc. A screw conveyor 5 powered by a motor 6 is mounted to the unit frame and has an inlet at a point below the top inlet to the hopper 6. Any suitable ad conventional type of conveyor can be used and such conveyor can be powered by a motor on the unit 1, or be hydraulically or electrically powered from the trenching machine or any other remote power unit. It is preferred that the speed of the conveyor 5 be adjustable.

The conveyor 5 is mounted parallel and offset to the centerline of the portion of the mechanized unit that is in the trench so that a utility line 7, described below, can pass the conveyor 5 as it enters the mechanized unit to be placed in the trench 2. As the unit 1 is moved, a portion of the select material 3 loaded into the hopper 4 is transported forward, in the direction of movement of the unit 1, by the conveyor 5. The amount of material transported forward is regulated by the adjustable speed of the conveyor 5.

The portion of the select material 3 that is transported forward by conveyor 5 exits the bottom and side of the conveyor 5 and drops along a chute 8 mounted to the unit frame. From the chute 8, the material passes into a bedding chamber 9 having an angled outlet 9a. The bottom of the mechanized unit 1 is open so that the select material 3 in bedding chamber 9 gravitates to the bottom 10 of the trench 2 to form a bed 13.

The mechanized unit 1 has a vertical side wall 48 on each side that is parallel to the side walls of the trench 2. This prevents material from the trench walls from interfering with laying of the utility. The side walls 48 are present in the area where the material leaves the bedding chamber 9. The bottom end of each side wall 48 is shaped in such a way to have an angle 23 outlet above the bottom 10 of the trench 2 in the area of the outlet of the bedding chamber 9. This is done to allow the material to flow to the actual slides of the trench as the bed 13 is formed and therefore fill the entire width of the trench bottom.

Figure 5:
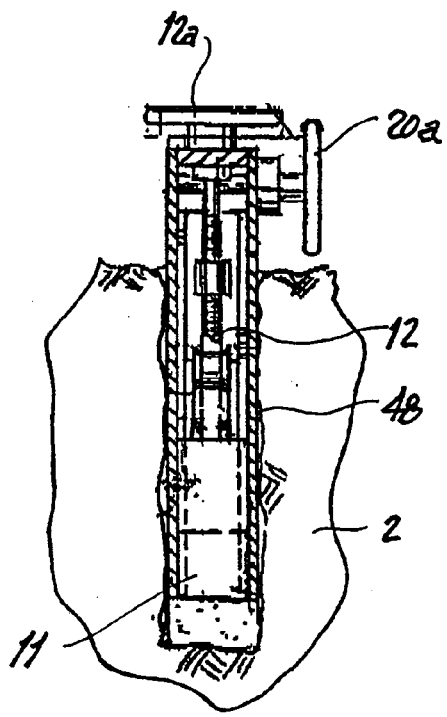
FIG. 5 is a rear view, partially in section of the blade adjusting device for the bedding taken along lines 5—5 of FIG. 2.

As the mechanized unit travels forward, the select material 3 laid for the bed 13 is struck off by a bedding strike off 11. This is a flat horizontal plate that extends across the width of the trench and whose height (bedding depth) is vertically adjustable by varying the bedding depth adjuster 12. There can be any suitable mechanism such as shown in FIG. 5 of a wheel operated vertical screw 12a that has the striker plate 11 mounted at the lower end of the screw. A powered electrical or hydraulic adjustment of plate 11 also can be used.

The utility or utilities 7 being installed are supplied from a source, such as one or more reels (not shown), mounted on the mechanized unit 1 or on a separate unit that is moved along the trench 2 parallel to unit 1. The utility or utilities 7 pass down through the mechanized unit 1 and are positioned onto the upper surface of the bed 13 by being moved through a guide device 14 which can be a series of rollers or chutes, as appropriate. If more than one utility is being laid in the trench, the rollers provide the desired spatial relationship between such utilities. A tracer wire 15 preferably is carried on a tracer mount 16 to be placed along the utility or utilities being installed and is positioned by a tracer wire guide (not shown).

The select material 3 in the hopper 4 that was not transported forward by conveyor 5 flows downward into an encasement chamber 18. The material in chamber 18 is dispensed through a chamber bottom outlet onto and around the utility or utilities 7 that have been placed on the bedding 13 upper surface to form an encasement 19. That is, the utility or utilities 7 are now fully protected by the material 3.

The unit side walls 48 have an angled opening 24 in the area of the encasement chamber 18 shaped in such a way up to the approximate height of the encasement depth. This permits the encasement material to flow out to the walls of the trench.

Figure 4:
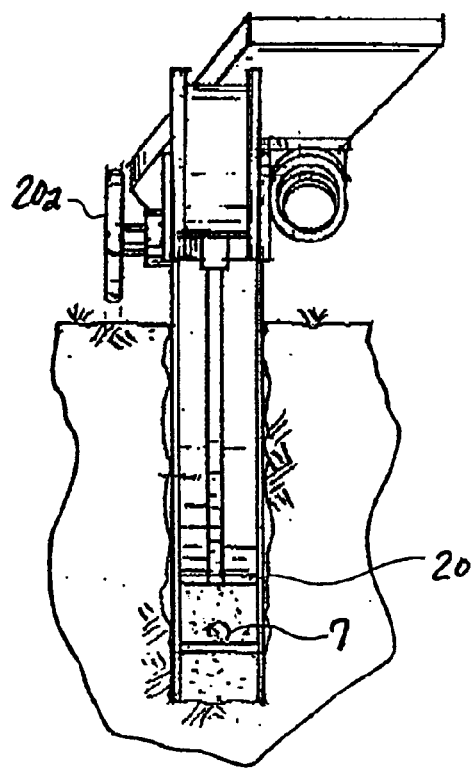
FIG. 4 is a rear elevational view of the blade that sets the encasement height.

The depth of the encasement 19 of the select material over the installed utility or utilities 7 is controlled by the position of a vertically adjustable encasement depth strike off 20. The strike off 20 can be a power driven compactor or a blade, either of which smoothes the top surface of the encasement 19. Adjustment of the strike off 20 can be made by a mechanical screw type arrangement, as previously described, operated by a wheel 20a (see FIG. 4) or by any suitable power driven mechanism.

After the material 3 has been placed around the utilities 7, soil 43, or any other type of backfill, is placed in the trench on the top of the encasement 19. A warning ribbon 21 is mounted on a warning ribbon bracket and reel assembly 22 for placement in the soil in the trench after encasement of the utility or utilities. The ribbon 21 provides a warning of the presence of the utilities encasement if there is digging in the area of the trench 2 at a later time.

An electrically controlled tether 25 is attached from the trenching machine or other motive source to the frame 50 of unit 1. The tether 25 is used to maintain or change the desired angular position of the mechanized unit 1 with relation to the bottom of the trench 2. The tether 25 permits the rear of the mechanized unit 1 to be raised or lowered in relationship to the bottom of the trench.

Specific feature of the invention are shown in one or more of the drawings for convenience only, as each feature may be combined with other features in accordance with the invention. Alternative embodiments will be recognized by those skilled in the art and are intended to be include within the scope of the claims.

I claim:

1. A movable unit for placing one or more utilities in an excavated trench, comprising:
   a hopper for receiving select material provided from a source;
   a conveyor that receives select material from said hopper and dispenses the material from an outlet on the bottom of the excavated trench as the unit moves to establish a bedding;
   a guide for placing a length of at least one utility on said established bedding as the unit moves; and
   an outlet on said hopper from which material is dispensed onto the bedding to encase the at least one utility previously placed on the bedding.

2. A unit as claimed in claim 1 further comprising:
   vertically adjustable means at said conveyor outlet to set the height of the bedding relative to the bottom of the trench.

3. A unit as claimed in claim 2 wherein said vertically adjustable means for setting the height of the bedding comprises a blade or plate which contacts the top surface of the bedding and also smoothes the bedding by surface.

4. A unit as claimed in claim 1 further comprising:
   adjustable means at said hopper outlet to set the height of the encasement relative to the top of the bedding.

5. A unit as claimed in claim 4 wherein said adjustable means for setting the height of the encasement comprises a blade which also smoothes the top surface of the encasement.

6. A unit as claimed in claim 1 and further comprising:
   a framework encompassing said conveyor outlet and said hopper outlet, said framework including spaced and opposing side walls that support the walls of the trench and to also prevent any undesirable materials from falling into the trench.

7. A unit as claimed in claim 6 wherein each of said side walls has an opening at the bottom thereof to permit material for the bedding to flow outwardly of said side walls.

8. A unit as claimed in claim 7 wherein each of said side walls has an opening at the bottom to permit material flowing from said hopper outlet for the encasement to flow outwardly of said side walls.

9. A unit as claimed in claim 1 wherein said conveyor is a screw type conveyor.

10. A unit as claimed in claim 1 wherein said conveyor has an inlet at said hopper above said conveyor outlet to receive the material from said hopper to be used to form the bedding.

11. A unit as claimed in claim 1 and further comprising:
    a chute located at the front of the conveyor outlet for directing the material for forming the bedding laid below the length of the at least one utility.

12. A unit as claimed in claim 1 and further comprising:
    a chamber at said hopper outlet to receive the material and to permit the material to fall by gravity onto and around the at least one utility that has been placed on the bedding.

13. A unit as claimed in claim 12 wherein said means for setting the height of the encasement comprises an adjustable gate at the rear end of said chamber that strikes off the material dispensed from said chamber to a predetermined depth above the installed said at least one utility.

14. A unit as claimed in claim 12 and further comprising a support frame located forward of said chamber relative to the direction of movement of the unit, and a reel or tracer cable mounted on said frame to be used for locating the at least one utility.

15. A unit as claimed in claim 12 and further comprising a warning ribbon dispenser to be placed above the encasement in the trench prior to final backfilling of the trench.

16. A unit as claimed in claim 1 and further comprising an electrically controlled tether connected to the unit to adjust the angular position of the unit with relation to the bottom of the trench.

17. A unit as claimed in claim 2 further comprising:
    adjustable means at said hopper outlet to set the height of the encasement relative to the top of the bedding.

18. A unit as claimed in claim 17 wherein said adjustable means for setting the height of the encasement comprises a blade which also smoothes the top surface of the encasement.

* * * * *

UNITED STATES PATENT AND TRADEMARK OFFICE
CERTIFICATE OF CORRECTION

PATENT NO.   : 6,854,931 B1
DATED        : February 15, 2005
INVENTOR(S)  : Michael E. Lopata It is certified that error appears in the above-identified patent and that said Letters Patent is hereby corrected as shown below:

Title page,
Item [73], Assignee, please delete "PLC Trenching Co., LCC., Clinton, NY" and substitute -- PLC Trenching Co., LLC, Clinton, NY --.

Signed and Sealed this

Twenty-fourth Day of May, 2005

JON W. DUDAS
*Director of the United States Patent and Trademark Office*